(12) United States Patent
Adetola et al.

(10) Patent No.: US 11,155,143 B2
(45) Date of Patent: Oct. 26, 2021

(54) LOAD MANAGEMENT FOR REFRIGERATED TRUCK UNIT

(71) Applicant: Carrier Corporation, Palm Beach Gardens, FL (US)

(72) Inventors: Veronica Adetola, West Hartford, CT (US); Yinshan Feng, Manchester, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 323 days.

(21) Appl. No.: 16/357,913

(22) Filed: Mar. 19, 2019

(65) Prior Publication Data

US 2019/0283541 A1    Sep. 19, 2019

Related U.S. Application Data (60) Provisional application No. 62/644,831, filed on Mar. 19, 2018.

(51) Int. Cl.
*B60H 1/32* (2006.01)
*B60H 1/00* (2006.01)

(52) U.S. Cl.
CPC ....... *B60H 1/3208* (2013.01); *B60H 1/00014* (2013.01); *B60H 1/00642* (2013.01); *B60H 1/00771* (2013.01); *B60H 1/3202* (2013.01); *B60H 1/3204* (2013.01); *B60H 1/3211* (2013.01); *B60H 1/3232* (2013.01); *B60H 2001/327* (2013.01); *B60H 2001/328* (2013.01); *B60H 2001/3236* (2013.01)

(58) Field of Classification Search
CPC .. B60H 1/3211; B60H 1/3232; B60H 1/3208; F25B 2700/151
See application file for complete search history.

(56) References Cited

U.S. PATENT DOCUMENTS

| | | | |
|---|---|---|---|
| 5,275,012 A * | 1/1994 | Dage ................. | B60H 1/00392 219/202 |
| 6,044,651 A | 4/2000 | Reason et al. | |
| 6,150,793 A | 11/2000 | Lesesky et al. | |
| 6,223,546 B1 | 5/2001 | Chopko et al. | |

(Continued)

FOREIGN PATENT DOCUMENTS

| KR | 100931864 B1 | 12/2009 |
|---|---|---|
| WO | 2011094099 A1 | 8/2011 |

(Continued)

OTHER PUBLICATIONS

European Patent Office, Extended European Search Report, Application No. 19163869.1-1012, dated Aug. 22, 2019 (8 pp.).

*Primary Examiner* — Nelson J Nieves
*Assistant Examiner* — Meraj A Shaikh
(74) *Attorney, Agent, or Firm* — Cantor Colburn LLP (57) ABSTRACT

Disclosed is a system for managing power in a transport refrigeration unit (TRU) installed on a trailer, having: a TRU controller configured to execute a range extender mode of operation to manage operations of the TRU and TRU components, wherein the TRU controller: selects a power management strategy from a plurality of demand-side power management strategies; determines, from the selected power management strategy, operational parameters for a TRU; and executes the generated operational parameters.

8 Claims, 5 Drawing Sheets

(56) References Cited

U.S. PATENT DOCUMENTS

| | | |
|---|---|---|
| 6,755,041 B2 | 6/2004 | Wessells et al. |
| 6,863,222 B2 | 3/2005 | Slifkin et al. |
| 7,286,046 B2 | 10/2007 | Kinsey et al. |
| 7,719,126 B2 | 5/2010 | Foreman |
| 7,743,616 B2 | 6/2010 | Renken et al. |
| 7,784,707 B2 | 8/2010 | Witty et al. |
| 8,004,242 B1 | 8/2011 | Purkey et al. |
| 8,030,880 B2 | 10/2011 | Alston et al. |
| 8,295,950 B1 | 10/2012 | Wordsworth et al. |
| 8,330,412 B2 | 12/2012 | Lattin |
| 8,643,216 B2 | 2/2014 | Lattin |
| 8,776,928 B2 | 7/2014 | Stover, Jr. et al. |
| 8,863,540 B2 | 10/2014 | Alston et al. |
| 9,045,018 B2 | 6/2015 | Swanson |
| 9,194,286 B2 | 11/2015 | Burnham et al. |
| 9,389,007 B1 | 7/2016 | Mckay |
| 9,557,100 B2 | 1/2017 | Chopko et al. |
| 9,580,003 B2 | 2/2017 | Olaleye |
| 9,586,458 B2 | 3/2017 | Larson et al. |
| 9,587,869 B2 | 3/2017 | Burnham et al. |
| 9,766,600 B2 | 9/2017 | Clarke |
| 9,776,473 B2 * | 10/2017 | Kolda ................ B60H 1/3232 |
| 2009/0229288 A1 * | 9/2009 | Alston ................ F25B 27/00 62/236 |
| 2013/0283826 A1 * | 10/2013 | Burnham ............ F25B 49/025 62/56 |
| 2013/0289762 A1 | 10/2013 | Olaleye |
| 2015/0338858 A1 * | 11/2015 | Bates ................ B60H 1/3232 62/56 |
| 2018/0361872 A1 * | 12/2018 | Zhou ................ H01M 10/613 |

FOREIGN PATENT DOCUMENTS

| | | |
|---|---|---|
| WO | 2013188888 A1 | 12/2013 |
| WO | 2014106060 A1 | 7/2014 |
| WO | 2017176682 A1 | 10/2017 |

* cited by examiner

LOAD MANAGEMENT FOR REFRIGERATED TRUCK UNIT

CROSS-REFERENCE TO RELATED APPLICATIONS

This application claims the benefit of an earlier filing date from U.S. Provisional Application Ser. No. 62/644,831 filed Mar. 19, 2018, which is incorporated herein by reference in its entirety.

BACKGROUND

Exemplary embodiments pertain to the art of power management and more specifically to power management in a transport refrigeration unit.

Refrigerated trailers may include a transport refrigeration unit (TRU) to provide proper conditioning for cargo shipped in the trailer. Larger diesel TRU engines may be replaced with efficient smaller engines in a hybrid system architecture, or eliminated in an all-electric design. Multiple complementary power sources in hybrid or engineless TRU should therefore be managed to realize design benefits. In addition to managing supplied energy, a demand-side power draw may be intelligently controlled to extend a service range of an integrated cooling system while maintaining reliability of the cargo.

For example, a battery powered TRU may possess an onboard rechargeable energy storage system (battery) that can be charged by direct connection to the power supply mains. Such power supply mains may include the Eastern Interconnection electric grid which is part of the Continental United States power transmission grid as well as any grid source or from a distributed generation source on a customer's location site or a delivery location site. The power supply mains may be alternating current (AC) at for example 50 Hz or 60 Hz, or the power may be direct current (DC) from a dispatachable or non-dispatchable source such as a solar grid on site or on a roof of the trailer housing the TRU. The TRU may also execute a power take-off process from the main vehicle engine or from kinetic energy recovered from the vehicle.

BRIEF DESCRIPTION

Disclosed is a system for managing power in a transport refrigeration unit (TRU) installed on a trailer, comprising: a TRU controller configured to execute a range extender mode of operation to manage operations of the TRU and TRU components, wherein the TRU controller: selects a power management strategy from a plurality of demand-side power management strategies; determines, from the selected power management strategy, operational parameters for a TRU; and executes the generated operational parameters.

In addition to one or more of the above disclosed features or as an alternative, the TRU components include TRU power supply components and TRU power demand components.

In addition to one or more of the above disclosed features or as an alternative, the TRU power supply components include one or more of a TRU battery and a TRU engine, and the TRU power demand components include one or more of a compressor, an evaporator, a condenser, cargo lights and the TRU controller.

In addition to one or more of the above disclosed features or as an alternative, the plurality of power management strategies include a first strategy of utilizing cargo thermal storage as a flexible power load, a second strategy of reducing a thermal energy delivery rate, and a third strategy of flexibly executing non-critical diagnostics and non-critical TRU system functions.

In addition to one or more of the above disclosed features or as an alternative, the first strategy comprises the TRU controller determining first strategy conditions of pre-cooling cargo at predetermined geographic mission locations where energy is available and reducing cooling set-points between the predetermined mission locations.

In addition to one or more of the above disclosed features or as an alternative, the TRU controller: determines cargo thermal storage capability by direct monitoring with thermal sensors or by inferring from operational data; identifies locations of and transportation times between the predetermined geographic mission locations based on dynamically updated GPS data and pan-mission proximity to electrical grid charging stations; and adjust the amount of TRU power demand for cooling between the predetermined mission locations by applying power load sharing strategies and power removing, reducing and/or peak limiting strategies.

In addition to one or more of the above disclosed features or as an alternative, the TRU controller implements the first strategy conditions and performs one or more of (i) adapting a cooling set-point for the cargo within a predetermined range; and (ii) modifying evaporator fan speed and/or condenser fan speed and/or compressor speed.

In addition to one or more of the above disclosed features or as an alternative, the second strategy comprises the TRU controller performing one or more of (i) limiting an opening of refrigeration cycle cooling valves, including one or more of expansion valves and suction modulation valves, and (ii) modifying TRU fan speed and/or TRU compressor speed.

In addition to one or more of the above disclosed features or as an alternative, the third strategy comprises the TRU controller performing one or more of (i) executing one or more non-critical diagnostic functions ahead of a predetermined schedule or deferring execution of the one or more non-critical diagnostic functions until arriving at a predetermined geographic mission location where energy is available, (ii) executing a defrost cycle based on non-periodic trigger events, and (iii) removing, reducing and/or peak-limiting non-critical power loads.

In addition to one or more of the above disclosed features or as an alternative, the TRU controller executes the range extender mode of operation before and periodically during missions.

Further disclosed is a method for managing power in a transport refrigeration unit (TRU) installed on a trailer, comprising one or more of the above disclosed features.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
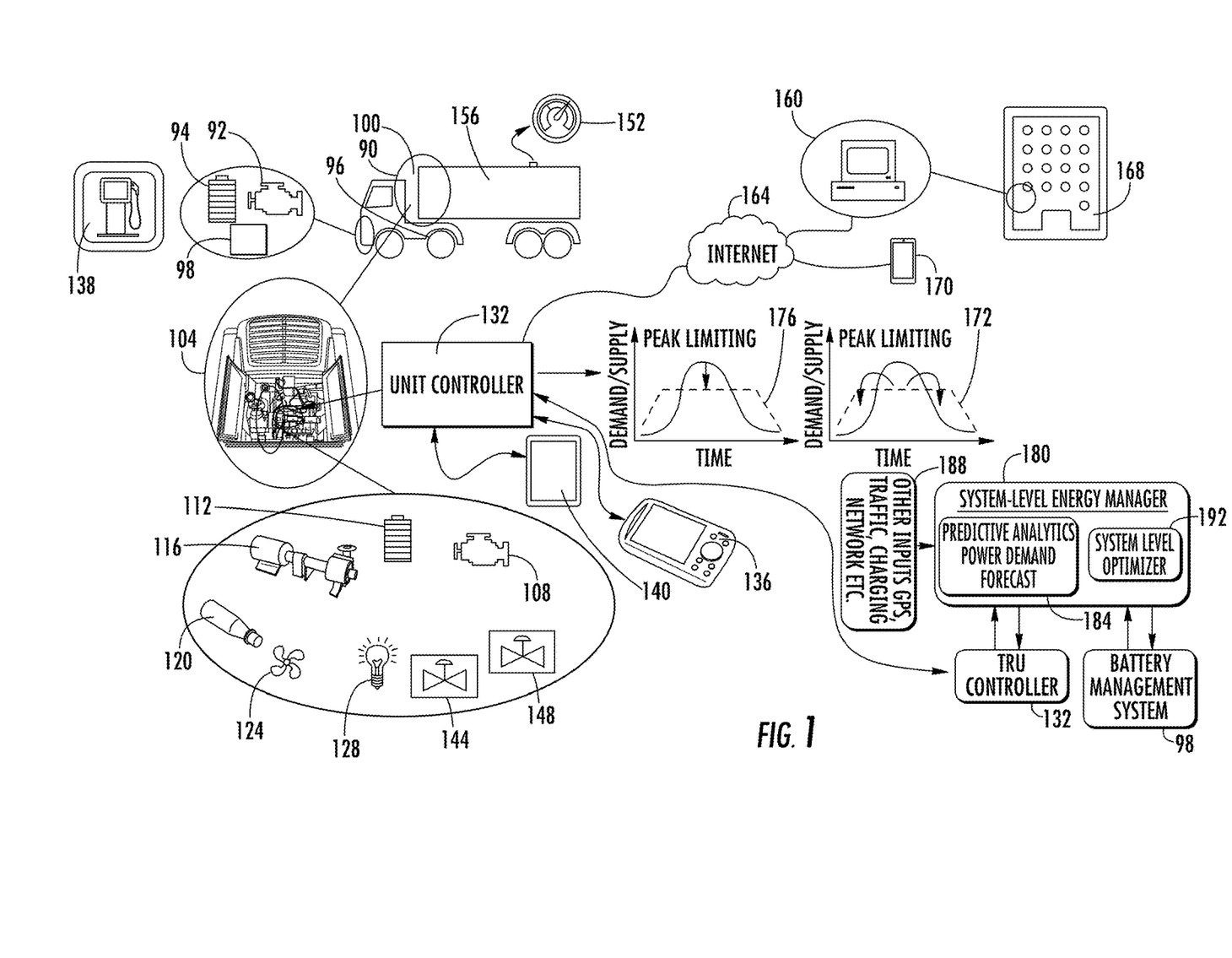
FIG. 1 is an illustration of components according to an embodiment.

Turning to FIG. 1, the operational environment of an embodiment may include a trailer 100 having therein a transport refrigeration unit (TRU) 104. The trailer may be hauled by a tractor 90 having a plurality of power supply components. The plurality of trailer power supply components may include one or more of a motor 92, a battery 94 and a power regenerative axle 96. In addition the trailer may have a power controller 98 for controlling the plurality of trailer power supply components.

The TRU may include a plurality of TRU components, including a plurality of TRU power supply components and a plurality of power demand components. The TRU power supply components may include a TRU engine 108 and a TRU battery 112. The plurality of TRU power demand components may include a compressor 116 which may be a variable compressor. The TRU power demand components may further include an evaporator/condenser 120 with an associated fan 124. In addition, the power demand components may include cargo lights 128.

The plurality of TRU components may be dynamically controlled by a TRU electronics controller 132. The TRU controller may be onboard the TRU engine or may be a separate component in the TRU. The TRU controller may be capable of communicating with the trailer TRU power controller for controlling the use and distribution of power from the trailer power supply components.

The TRU controller may be equipped with a service providing dynamically updated Global Positioning Systems (GPS) data 136. Through the GPS the TRU controller may be able to identify best routes, a distance to a service station 138, and the like. It is to be appreciated that for an electrically powered TRU, the service station 138 would be connected to the electric grid. The TRU controller may include a visual interface 140. It is to be appreciate that the TRU controller is also a power sink. The TRU controller may control a plurality of cooling valves including an expansion valve 144 and a suction modulation valve 148.

In addition, the TRU controller may communicate with a cargo sensor 152 disposed in a cargo storage area 156. The cargo sensor may be, for example, a thermal sensor. The TRU controller may communicate with and be programmed by a central server 160 which may be a fleet central server that manages a fleet of such trailers. Such communications may occur via cellular or other wireless network 164 or a wired network determined at a fleet headquarters 168. Communications may also be with one or more cellular devices 170 in possession of the vehicle operator or maintenance personnel for diagnostic or other operational purposes.

Figure 2:
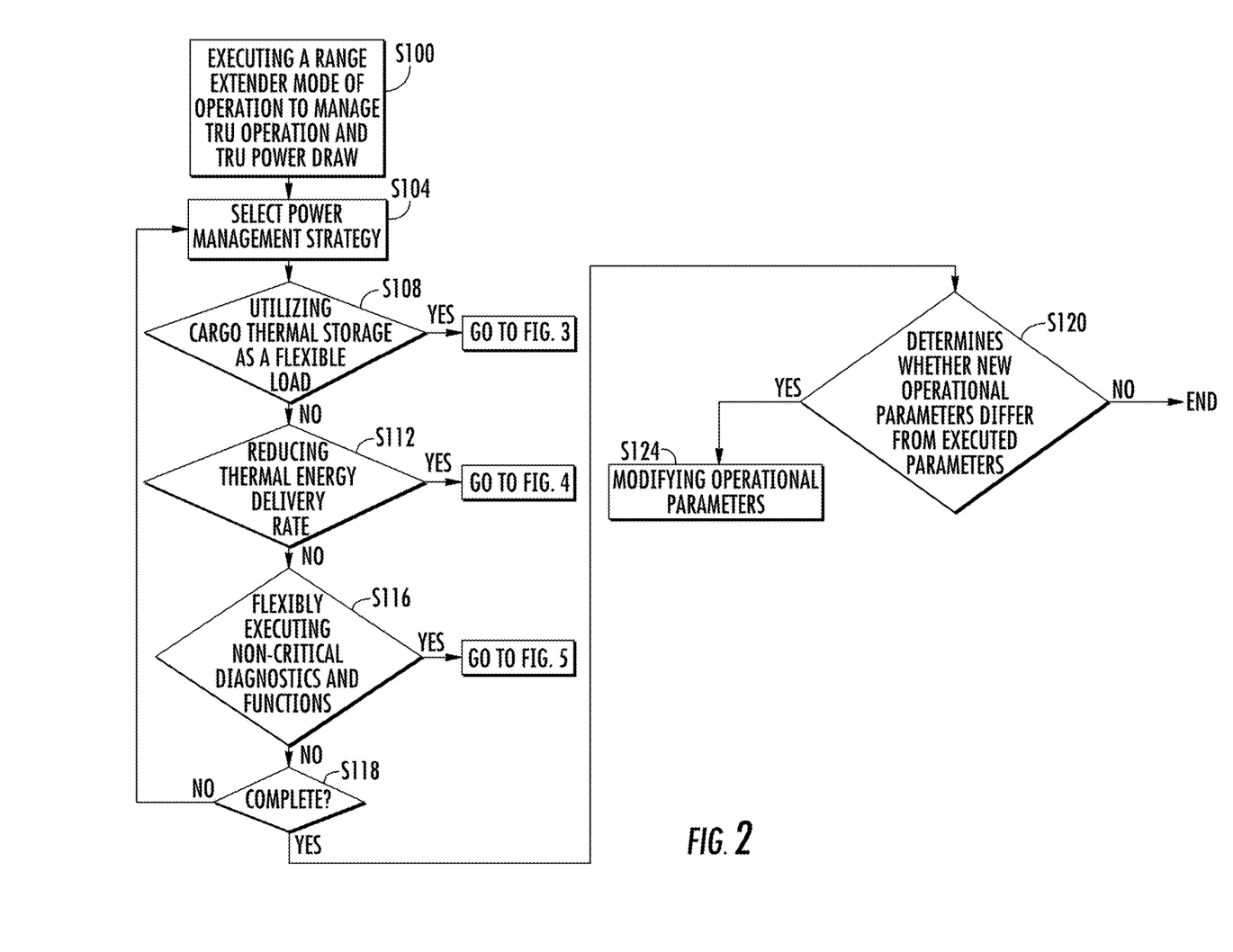
FIG. 2 is a flowchart according to an embodiment.

Turning to FIG. 2, in one embodiment the TRU controller may manage demand-side energy requirements to extend the TRU operational range. The purpose of this process is to adaptively manage power requirements based on power availability, including when power is available and how much power is available. This process may be automatically initiated by the TRU controller. Alternatively, this process may be initiated in response to dynamic communications between the TRU controller and the fleet central server. Yet alternatively, this process may be initiated by the trailer operator via direct interaction with the TRU controller through the on board visual interface or using the mobile device. This decision process could include current and future predictions of energy available from dispatachable or non dispatchable sources such as solar.

In managing the energy requirements of the TRU, the TRU controller may perform step S100 of executing a range extender mode of operation to manage TRU operation and power draw. In the range extender mode, the TRU configures a flexible TRU energy consumption management strategy by, for example, accounting for forecasts of required thermal load and specifics of the delivery mission.

At step S104, the TRU controller performs the step of selecting a power management strategy. At step S108, the TRU controller determines whether to select utilizing cargo thermal storage as a flexible load for the power management strategy, discussed in detail below. At step S112, the TRU controller determines whether to select reducing a thermal energy delivery rate for the power management strategy, discussed in detail below. At step S116, the TRU controller determines whether to select flexibly executing non-critical diagnostics and other functions for the power management strategy, discussed in detail below. The illustrated order of executing steps S108, S112 and 116 is not limiting. At step S118 the TRU controller determines whether the step S104 should be revisited or whether this part of the process is complete.

If the determination at step S118 is "yes" then the TRU controller performs step S120 of determining if step S100 is being executed during a transport mission and if the newly determined parameters differ from the currently executed parameters. If the determination of S120 is "yes" then the controller performs step S124 of modifying executed operational parameters for the TRU to provide improved load management for the remainder of the mission. If the determination of step S120 is "no" then no change in parameters is executed.

Figure 3:
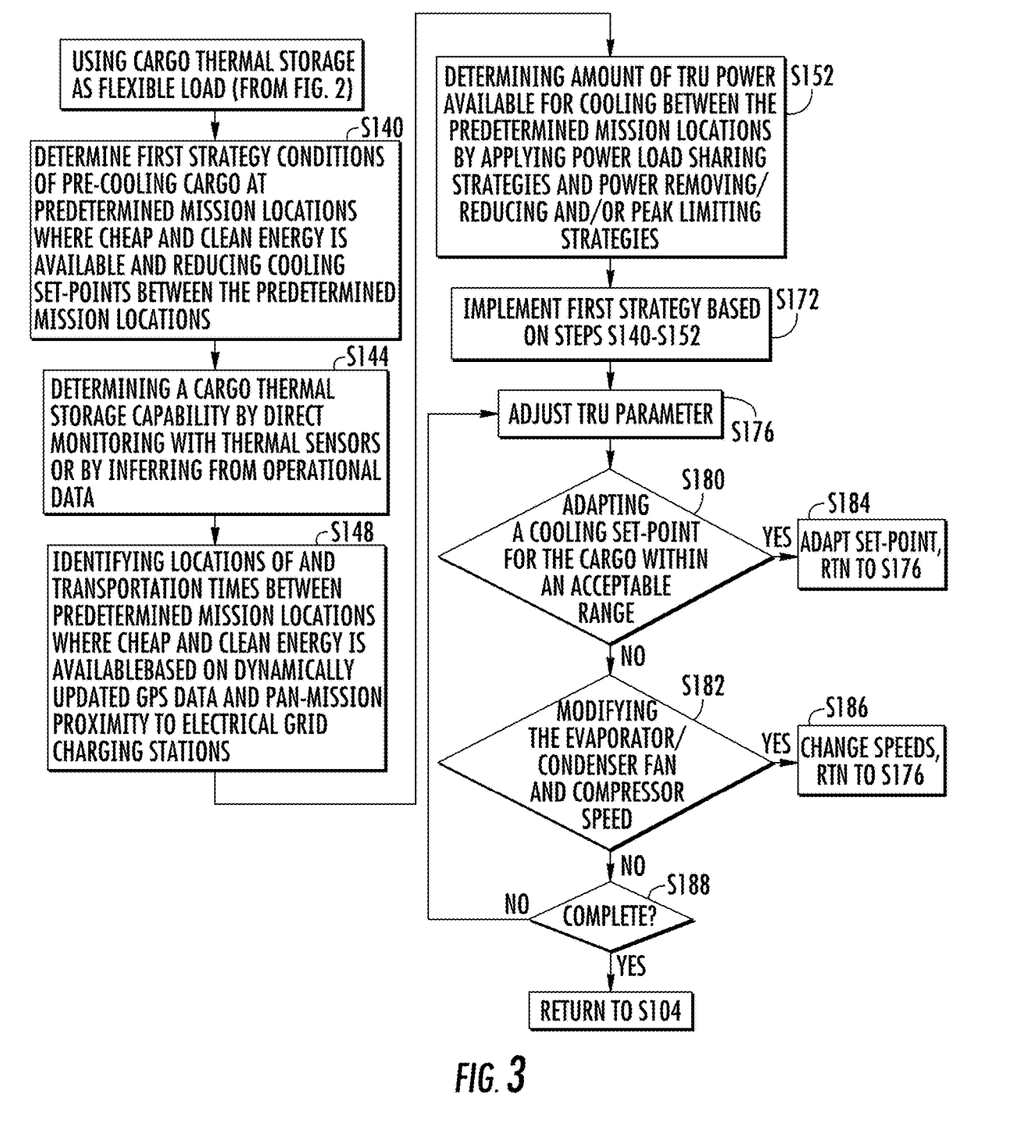
FIG. 3 is a flowchart according to an embodiment.

Turning to FIGS. 1, 2 and 3, if the TRU controller selected "yes" at step S108 then the TRU controller may perform step S140 of determining first strategy conditions of pre-cooling cargo at predetermined geographic mission locations where cheap and clean energy is available and reducing cooling set-points between the predetermined mission locations. At step S144 the TRU controller may determine a cargo thermal storage capability by direct monitoring with thermal sensors or by inferring from operational data. Cargo thermal storage refers to how much heat or cold cargo can store and this may be determined this by how much and how fast cargo loses stored energy. In the absence of a cargo sensor, including for example cargo space air temperature sensors, this can be inferred from the dynamics, for example rise time, of temperature in the storage area.

At step S148 the TRU controller may identify locations of and transportation times between predetermined mission locations where cheap and clean energy is available based on dynamically updated GPS data and pan-mission proximity to electrical grid charging stations. At step S152 the TRU controller may determine an amount of TRU power available for cooling between the predetermined mission locations by applying power load sharing strategies and power removing, reducing and/or peak limiting strategies. How much power the refrigeration unit will need (demand) is adjusted by modifying operating parameters, for example, changing actuator speeds and cooling set point.

At step S172 the TRU controller may implement the first strategy based on steps S140-S152. That is, the TRU controller may pre-cool the cargo or reduce cooling until, for example, grid power is available. For either of these options, the TRU controller may execute step S176 of selecting a TRU parameter to adjust. At step S180 the TRU controller may select adapting a cooling set-point for the cargo within an acceptable range for pre-cooling or reduced cooling based on the location in the mission. At step S182 the TRU controller may select modifying the evaporator and/or condenser fan speed and compressor speed for pre-cooling or reduced cooling based on the location in the mission.

A response of "yes" at step S180 may result in the TRU controller performing step S184 of adapting the cooling set-point while a response of "yes" at step S182 may result in the TRU controller performing step S186 of changing the fan speed and/or compressor speed. The illustrated order of executing steps S180 and S182 is not limiting and upon executing either of these steps the TRU controller returns to step S176. At step S188 the TRU controller may determine whether step S176 should be revisited or whether this part of the process is complete. A determination of "yes" at step S188 may proceed with the TRU controller returning to step S104.

Figure 4:
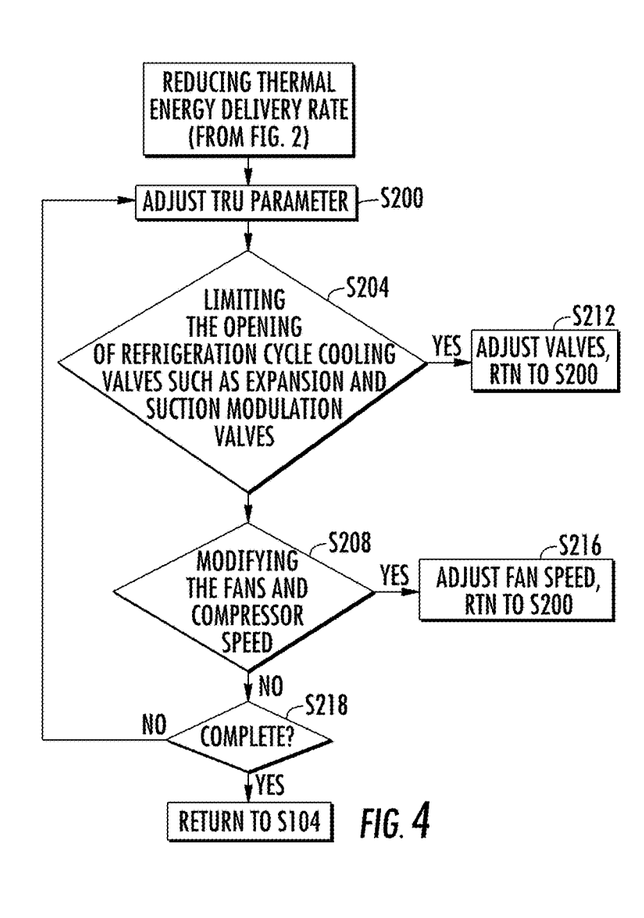
FIG. 4 is a flowchart according to an embodiment.

Turning to FIGS. 1, 2 and 4, if the TRU controller selected "yes" at step S112 then the TRU controller may perform step S200 of selecting a TRU parameter to adjust. At step S204 the TRU controller may select limiting the opening of refrigeration cycle cooling valves such as expansion and suction modulation valves. At step S208 the TRU controller may select modifying the evaporator/condenser fan speed and/or compressor speed. A response of "yes" at step S204 may result in the TRU controller performing step S212 of adjusting the valves. A response of "yes" at step S208 may result in the TRU controller performing step S216 of adjusting the fan speed and/or compressor speed. The illustrated order of executing steps S204 and S208 is not limiting and upon executing any of these steps the TRU controller returns to step S200. At step S218 the TRU controller determines whether step S220 should be revisited or whether this part of the process is complete. A determination of "yes" at step S218 proceeds with the TRU controller returning to step S104.

Figure 5:
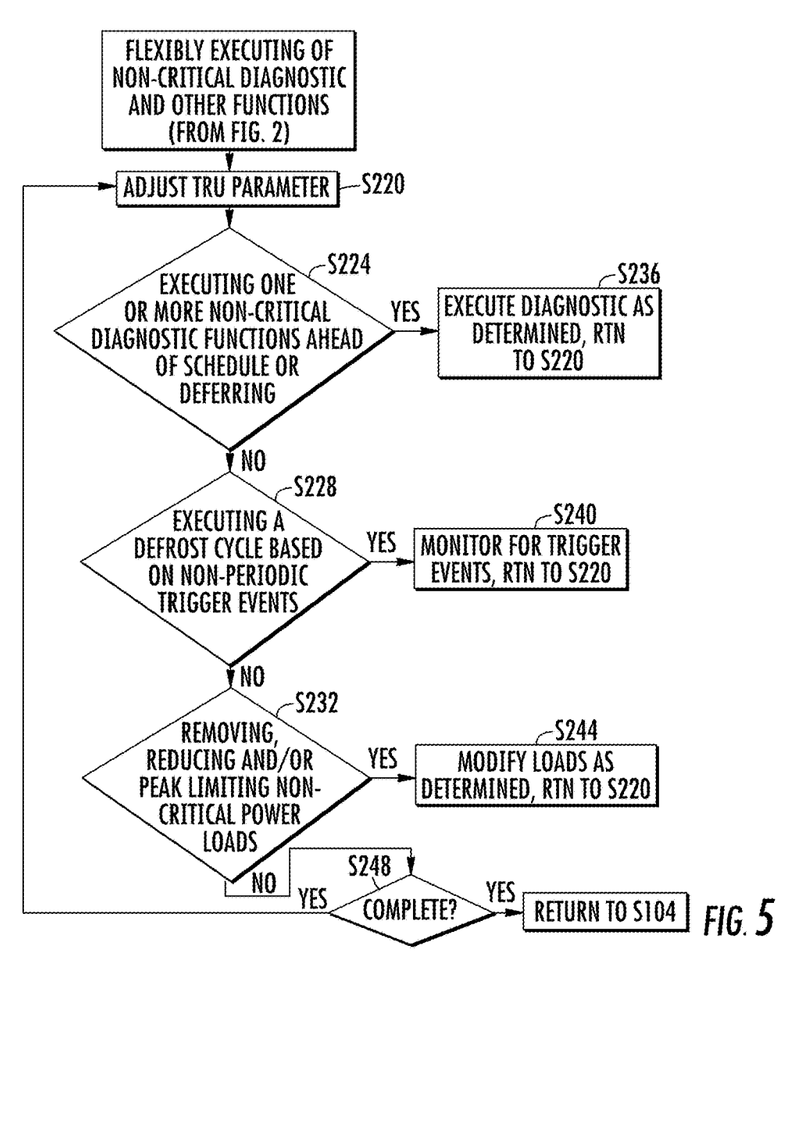
FIG. 5 is a flowchart according to an embodiment.

Turning to FIGS. 1, 2 and 5, if the TRU controller selected "yes" at step S116 then the TRU controller may perform step S220 of selecting a TRU parameter to adjust. Given the state of the TRU power availability, the TRU controller may perform step S224 of executing one or more non-critical diagnostic functions ahead of a predetermined schedule. At the same step the TRU controller may select deferring execution of such non-critical diagnostic functions until reaching a predetermined geographic mission location where energy is available, that is, a service station or a mission final destination. At step S228 the TRU controller may determine whether to execute a defrost cycle based on non-periodic trigger events rather a periodic approach. At step S232 the TRU controller may determine whether to remove/reduce/peak power limit or adapt non-critical loads such as light dimming and TRU controller display functions.

A response of "yes" at step S244 may result in the TRU controller performing step S236 of executing the diagnostic as determined, either ahead of the predetermined schedule or at the deferred time. A response of "yes" at step S228 may result in the TRU controller performing step S240 of monitoring for non-periodic trigger events before executing the defrost cycle. A response of "yes" at step S232 may result in the TRU controller performing step S244 of removing, reducing and/or peak limiting power loads as determined. The illustrated order of executing steps S236, S240 and S244 is not limiting and upon executing any of these steps the TRU controller returns to step S220. At step S248 the TRU controller determines whether step S220 should be revisited or whether this part of the process is complete. A determination of "yes" at step S248 proceeds with the TRU controller returning to step S104.

The above disclosed process may provide an ability to flexibly adjust load power consumption according to an available power supply and to make the TRU operations more resilient and robust to failures. The process may preserve a quality of transported goods during energy limiting conditions.

Figure 6:
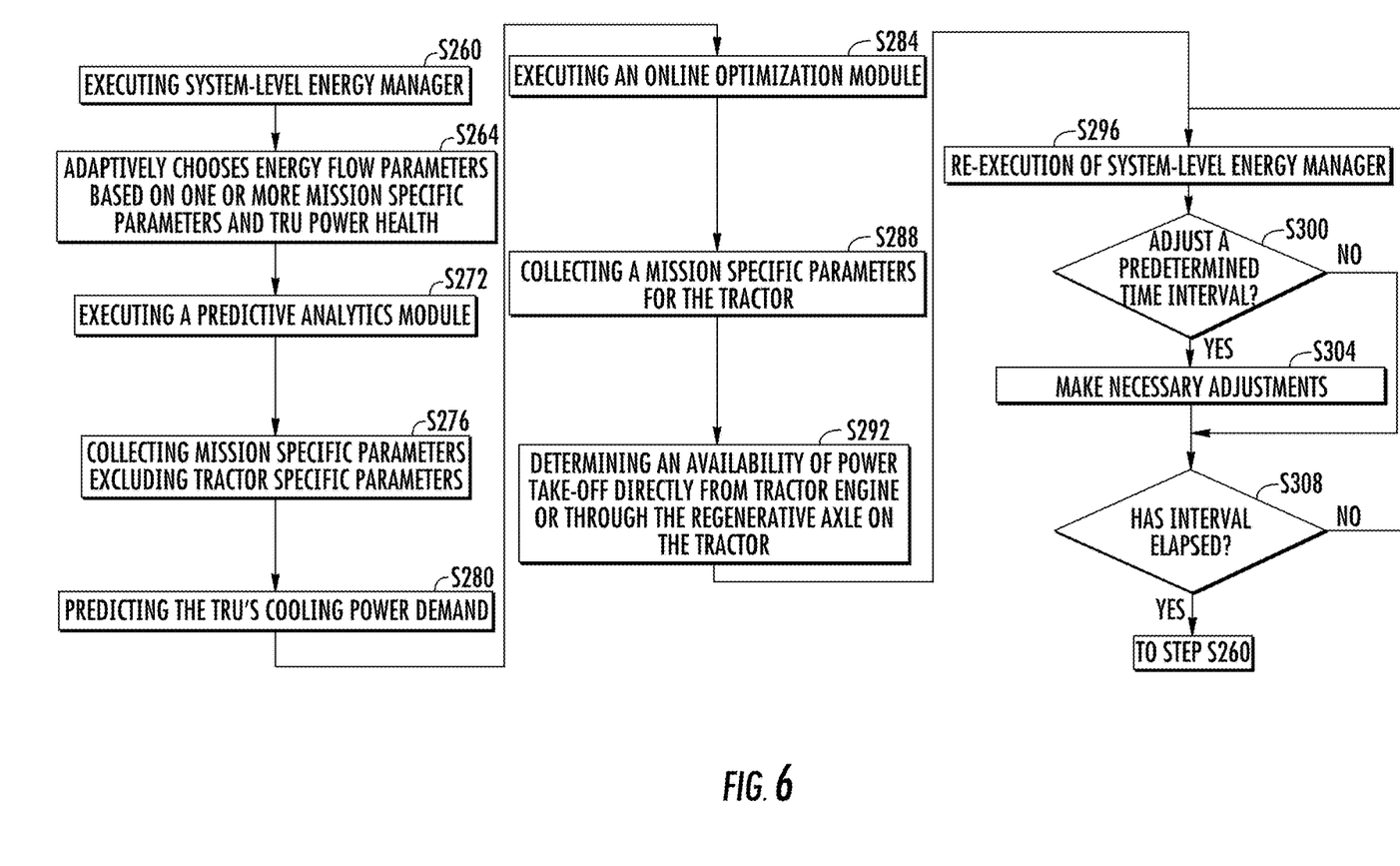
FIG. 6 is a flowchart according to an embodiment.

Turning now to FIGS. 1 and 6, instead of or in addition to executing the processes identified in FIGS. 2-5, when attempting to manage power systems in the trailer the TRU controller may perform step S260 of executing a first program 180 that functions as a system-level energy manager.

By executing the first program the TRU controller may perform step S264 of adaptively choosing energy flow parameters based on one or more mission specific parameters and TRU power health, such as state of battery charge and battery health. The mission specific parameters may include one or more of actual and forecasted in-route weather and traffic conditions, driver preferences, in-route proximity to an electrical grid charging station, loaded cargo type, cargo required temperature set-points and airflow, cargo current temperature and refrigeration cycle efficiency. For example, the loaded cargo type may be perishable or unperishable, cargo required temperature set-points are below or above freezing temperatures for loaded cargo, and driver preferences define a minimum duration of time between connecting to an electrical grid charging station. TRU power health includes an observed and a pan-mission anticipated state of TRU power supply components and power demand components. The refrigeration cycle efficiency may be learned from recorded trends/historical data related to the TRU operational mode, outside air temperature, altitude, and cooling/heating load. As a result of executing the first program, the TRU controller may make a holistic decision on how to better coordinate the operation of the TRU and the installed power supply options to meet the goal(s) of the delivery mission.

In one embodiment, by executing the first program, the TRU controller may perform step S272 of executing a first module 184 that is a predictive analytics module. By executing the first module the TRU controller may perform step S276 of collecting a first dataset of information 188 that is the mission specific information. With this collected dataset of information the TRU controller may perform step S280 of predicting the TRU's cooling power demand.

In one embodiment, by executing the first program, the TRU controller may perform step S284 of executing a second module 192 that is an online optimization module. By executing the second module, the TRU controller may execute step S288 of generating a power source schedule for the TRU based on the power demand for the specific loaded cargo determined in step S280.

In addition, by executing the second module, the TRU controller may perform step S288 of coordinating battery usage with the tractor power controller. By performing step S288 the TRU controller may perform step S292 of collecting a second dataset of information. The second dataset of information may include mission specific information for the tractor including predicted vehicle speed cycle. With the first dataset information and the second dataset of information, the TRU controller may perform step S292 of determining an availability of power take-off directly from tractor engine or through the regenerative axle on the tractor.

At step S296 the TRU controller may determine during a mission whether to re-execute the system-level energy manager. This step may include the TRU executing step S300 of determining whether to adjust a predetermined time interval based on updated mission specific conditions and TRU power health. If the determination at step S300 is "yes" then the TRU controller may perform step S304 of adjusting the period between executing the system-level energy manager. After adjusting the time at step S304, or if the determination at step S300 is "no", then the TRU controller may perform step S308 of determining whether the currently set time interval has elapsed. If the determination at step S308 is "no" then the TRU controller may cycle back to step S296. If the determination at step S308 is "yes" then the TRU controller may cycles back to step S260.

Using holistic information of the current and predicted behavior of the system to actively manage power flow and the battery operation may enable uninterrupted operation of the TRU while improving the operational efficiency of the integrated system. This approach may also (i) enable prioritization of cleaner energy for operation in urban areas with stricter emission and noise regulations, (ii) minimize fuel consumption and emissions for systems with installed range extenders, that is, with reduced sized engines, to ensure the TRU runs only when it is absolutely necessary, and (iii) minimize operational cost, for example, by optimizing grid charging during peak hour against fuel cost.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for managing power in a transport refrigeration unit (TRU) installed on a trailer, comprising:
    a TRU controller configured to execute a power management mode of operation, before and periodically during missions, to manage operations of the TRU and TRU components including TRU power supply components and TRU power demand components,
    wherein the TRU controller is configured to:
    select a power management strategy from a plurality of demand-side power management strategies; and
    execute the selected power management strategy, wherein the plurality of power management strategies includes:
    a first strategy of utilizing cargo thermal storage as a power load, which includes the TRU controller determining how much cold energy is capable of being stored by cargo in the trailer, and how fast cargo in the trailer loses stored energy, by direct monitoring with thermal sensors or by inferring from operational data, and thereafter:
        (i) determining to pre-cool cargo at predetermined geographic mission locations where energy is available; and
        (ii) reducing cooling set-points between the predetermined geographic mission locations;
    a second strategy of reducing a thermal energy delivery rate, which includes the TRU controller performing one or more of:
        (i) limiting an opening of refrigeration cycle cooling valves, including one or more of expansion valves and suction modulation valves; and
        (ii) modifying one or both of TRU fan speed and TRU compressor speed; and
    a third strategy of flexibly executing diagnostics and TRU system functions by one or more of:
        (i) executing one or more diagnostic functions ahead of a predetermined schedule or deferring execution of the one or more diagnostic functions until arriving at a predetermined geographic mission location where energy is available; and
        (ii) executing a defrost cycle based on non-periodic trigger events.

2. The system of claim 1 wherein
    the TRU power supply components include one or more of a TRU battery and a TRU engine, and the TRU power demand components include one or more of a compressor, an evaporator, a condenser, cargo lights and the TRU controller.

3. The system of claim 1 wherein when executing the first strategy, the TRU controller:
    identifies locations of and transportation times between the predetermined geographic mission locations based on dynamically updated GPS data and pan-mission proximity to electrical grid charging stations; and
    adjust the amount of TRU power demand for cooling between the predetermined mission locations by applying one or more of:
    a power load sharing strategy;
    a power removing strategy;
    a power reducing strategy; and
    a peak limiting strategy.

4. The system of claim 3 wherein
    the TRU controller is configured to implement the first strategy conditions by one or more of;
    (i) adapting a cooling set-point for the cargo within a predetermined range; and
    (ii) modifying one or more of: evaporator fan speed; condenser fan speed; and compressor speed.

5. A method for managing power in a transport refrigeration unit (TRU) installed on a trailer, comprising:
    a TRU controller configured to execute a power management mode of operation, before and periodically during missions, to manage operations of the TRU and TRU components including TRU power supply components and TRU power demand components,
    wherein the TRU controller:
    selects a power management strategy from a plurality of demand-side power management strategies; and
    execute the selected power management strategy, wherein the plurality of power management strategies includes:
    a first strategy of utilizing cargo thermal storage as a power load, which includes the TRU controller determining how much cold energy is capable of being stored by cargo in the trailer, and how fast cargo in the trailer loses stored energy, by direct monitoring with thermal sensors or by inferring from operational data, and thereafter:
  (i) determining to pre-cool cargo at predetermined geographic mission locations where energy is available; and
  (ii) reducing cooling set-points between the predetermined geographic mission locations;
a second strategy of reducing a thermal energy delivery rate, which includes the TRU controller performing one or more of:
  (i) limiting an opening of refrigeration cycle cooling valves, including one or more of expansion valves and suction modulation valves; and
  (ii) modifying one or both of TRU fan speed and TRU compressor speed; and
a third strategy of flexibly executing diagnostics and TRU system functions by one or more of:
  (i) executing one or more diagnostic functions ahead of a predetermined schedule or deferring execution of the one or more diagnostic functions until arriving at a predetermined geographic mission location where energy is available; and
  (ii) executing a defrost cycle based on non-periodic trigger events.

6. The method of claim 5 wherein
the TRU power supply components include one or more of a TRU battery and a TRU engine, and the TRU power demand components include one or more of a compressor, an evaporator, a condenser, cargo lights and the TRU controller.

7. The method of claim 5 wherein when executing the first strategy, the TRU controller:
identifies locations of and transportation times between the predetermined geographic mission locations based on dynamically updated GPS data and pan-mission proximity to electrical grid charging stations; and
adjust the amount of TRU power demand for cooling between the predeterminded mission locations by applying one or more of:
a power load sharing strategy;
a power removing strategy;
a power reducing strategy; and
a peak limiting strategy.

8. The method of claim 7 wherein
the TRU controller implements the first strategy conditions by;
(i) adapting a cooling set-point for the cargo within a predetermined range; and
(ii) modifying one or more of: evaporator fan speed; condenser fan speed; and compressor speed.

* * * * *